United States Patent
Laslo et al.

(10) Patent No.: US 7,560,084 B2
(45) Date of Patent: Jul. 14, 2009

(54) METHOD AND DEVICE FOR SEPARATION OF SULPHUR DIOXIDE FROM A GAS

(75) Inventors: Dennis J. Laslo, Knoxville, TN (US);
Michael Chiang, Knoxville, TN (US);
David J. Muraskin, Knoxville, TN (US); Michael J. Rini, Knoxville, TN (US); Michael G. Varner, Knoxville, TN (US)

(73) Assignee: Alstom Technology Ltd, Baden (CH)

( * ) Notice: Subject to any disclaimer, the term of this patent is extended or adjusted under 35 U.S.C. 154(b) by 203 days.

(21) Appl. No.: 11/694,063

(22) Filed: Mar. 30, 2007

(65) Prior Publication Data
US 2008/0241036 A1 Oct. 2, 2008

(51) Int. Cl.
*B01D 53/50* (2006.01)
*B01D 53/74* (2006.01)
*B01D 53/78* (2006.01)

(52) U.S. Cl. .............. 423/242.1; 423/243.01; 423/DIG. 5; 422/110; 422/111; 422/168; 422/169; 422/170

(58) Field of Classification Search .............. 423/242.1, 423/243.01, DIG. 5; 422/110, 111, 168, 422/169, 170
See application file for complete search history.

(56) References Cited
U.S. PATENT DOCUMENTS

| | | | |
|---|---|---|---|
| 4,239,515 A * | 12/1980 | Yanagioka et al. | 96/272 |
| 4,263,021 A | 4/1981 | Downs et al. | |
| 5,281,402 A | 1/1994 | Gohara et al. | |
| 5,429,808 A | 7/1995 | Kuroda et al. | |
| 5,451,250 A | 9/1995 | Gohara et al. | |
| 5,510,094 A * | 4/1996 | Bhat et al. | 423/243.07 |
| 5,693,301 A * | 12/1997 | Åhman | 423/243.03 |
| 5,759,505 A * | 6/1998 | Nolin et al. | 423/243.08 |
| 6,531,104 B1 | 3/2003 | Borio et al. | |

(Continued)

FOREIGN PATENT DOCUMENTS

CH 504224 3/1971

(Continued)

OTHER PUBLICATIONS

PCT International Search Report and The Written Opinion of the International Searching Authority dated Jul. 15, 2008—(PCT/US2008/058379).

*Primary Examiner*—Timothy C Vanoy
(74) *Attorney, Agent, or Firm*—Wiggin and Dana LLP; Anthony P. Gangemi

(57) ABSTRACT

A system for separating sulfur dioxide from a gas using an aqueous absorption liquid. The system includes a housing, an apertured plate, an outlet box, a distribution mechanism, a container, and a pump. The housing has an inlet and an outlet. The apertured plate is positioned between the inlet and the outlet and includes a lower side, an upper side, and apertures fluidly connecting the lower and upper sides. The outlet box includes a distribution mechanism that is arranged so that the absorption liquid draining from the outlet box contacts the gas from the inlet before the gas passes through the apertures in the apertured plate. The container contains the absorption liquid and is fluidly connected with the housing. The pump draws the absorption liquid from the container through the pump and through a conduit to the upper side of the apertured plate.

29 Claims, 4 Drawing Sheets

U.S. PATENT DOCUMENTS

| | | |
|---|---|---|
| 6,685,902 B2 | 2/2004 | Morin et al. |
| 6,923,852 B2 | 8/2005 | Vrotsos |
| 7,094,382 B2 | 8/2006 | Bengtsson et al. |
| 7,153,481 B2 * | 12/2006 | Bengtsson et al. ..... 423/243.01 |
| 2004/0156769 A1 * | 8/2004 | Bengtsson et al. ..... 423/243.01 |
| 2006/0117953 A1 | 6/2006 | Bengtsson et al. |

FOREIGN PATENT DOCUMENTS

| | | |
|---|---|---|
| DE | 2917720 | 11/1979 |
| EP | 0162536 | 11/1985 |

* cited by examiner

METHOD AND DEVICE FOR SEPARATION OF SULPHUR DIOXIDE FROM A GAS

BACKGROUND (1) Field

The present application generally relates to a method and device for separation of sulfur dioxide from a gas. In particular, the present application is directed to a method and device for separation of sulfur dioxide from a gas, which includes one or more recirculation pumps for pumping an absorption liquid to a spray tower and across an apertured plate.

(2) Description of the Related Art

Sulfur dioxide and other acid gases, e.g., sulfur trioxide, hydrochloric acid gas, and hydrogen fluoride gas form in the oxidation of sulfur-containing materials, such as coal, oil, natural gas, industrial and domestic waste, peat, etc. Sulfur dioxide and other acid gases can also form as a residual product in chemical processes, for instance metallurgical processes. Normally, it is not permitted to emit large amounts of sulfur dioxide and other acid gases into the atmosphere, which means that some kind of cleaning is necessary. One example of this is flue gas cleaning in power plants and other combustion plants. The flue gas that forms in combustion in such plants is usually cleaned, among other things, by absorption of sulfur dioxide and other acid gases into absorption liquid. The absorption liquid can, for instance, contain water and one or more of the substances lime, limestone, dolomite, sodium hydroxide solution, and similar substances, which are suitable for the absorption of sulfur dioxide. The flue gases can, for instance, be cleaned in a spray tower as disclosed for instance in EP 0 162 536, or by means of a perforated tray, as disclosed for instance in U.S. Pat. No. 5,246,471. However, these devices for cleaning gases, in particular flue gases, from sulfur dioxide and acid gases have been found to require a great deal of energy as large amounts of absorption liquid is pumped at a relatively high pressure.

U.S. Pat. No. 4,099,925, U.S. Pat. No. 5,660,616, U.S. Pat. No. 4,239,515, and WO 96/00122 describe cleaning apparatuses with low energy consumption. The flue gas is conveyed upwards through an apertured plate, on which a flowing layer of an absorption liquid is provided.

If the flue gas is not saturated with water vapor, water will evaporate from the absorption liquid and be added to the flue gas during the cleaning process. It has been found that this evaporation partially takes place when the flue gas passes through the apertured plate. One problem is that substances, such as lime, limestone, gypsum, calcium sulfite, sodium sulfate, etc, which are dissolved or suspended in the absorption liquid, tend to be evaporated and precipitated on the underside of the apertured plate and in the holes of the apertured plate. This increases the pressure drop across the apertured plate and makes the pressure drop vary over the area of the apertured plate. This results in increased energy consumption due to the increased pressure drop and in reduced absorption of sulfur dioxide due to the uneven distribution of flue gas in the layer of absorption liquid on the apertured plate. The prior-art solution to this problem is to arrange, before the cleaning apparatus with the apertured plate, a cooler in the form of a separate spray tower, for instance of the type disclosed in U.S. Pat. No. 5,753,012. In the separate spray tower, into which the flue gas is first introduced, an aqueous liquid is injected at a ratio (also called L/G) of the flow of liquid to the flow of flue gas of typically about 0.2 to 1 liter of liquid/cubic meters of flue gas and at such a high pressure that the liquid is atomized and saturates the flue gas with water vapor. After being saturated with water vapor, the flue gas can be passed through the apertured plate without the risk of solids being precipitated. A separate spray tower is however, a complicated and energy-consuming solution, which comprises pumps, pipes, tanks, control systems and a separate tower. In addition, when using such a spray tower semi-dry particles can form, which adhere to the underside of the apertured plate. It is therefore sometimes necessary to arrange a system for intermittent washing of the underside of the apertured plate.

U.S. Pat. Nos. 4,263,021, 5,281,402, and 6,923,852 are directed to systems including trays for improving gas-liquid contact. These systems include a conventional mechanism for moving an absorption liquid to the top of the tray, e.g., by pumping the absorption liquid through a conduit to nozzles positioned above a top surface of the trays. Accordingly, the flow rate of gas flowing in such systems is limited by the geometry of the ductwork and vessel, the size of the pump, and the number of nozzles. In addition, these systems operate under dual flow conditions where the absorption liquid drips through the holes in the tray rather than by gravity through a conduit.

Referring now to FIG. 1, U.S. Pat. No. 7,094,382, which is hereby incorporated by reference as if disclosed herein in its entirety, describes a device 20 for separating sulfur dioxide from a gas 21, which includes a spray tower 22 having an inlet duct 24 for the gas, an outlet duct 26 for the gas, from which sulfur dioxide has been separated, and an apertured plate 28 arranged between the inlet and the outlet. The gas passes through apertures 30 in apertured plate 28 from below. A flowing layer of absorption liquid 32 is supported by an upper side 34 of apertured plate 28. An inlet duct 36 connects a container 38 for absorption liquid to upper side 34 of apertured plate 28. A pump 40 is utilized to introduce compressed air 42 into the absorption liquid thereby serving as an airlift, which conveys the absorption liquid from container 38, through inlet duct 36, to upper side 34 of apertured plate 28, and along the apertured plate. The absorption liquid flows back to container 38 through apertures 30 and through an opening 44 in an outlet box 46 at end of apertured plate 28 opposite inlet duct 36. The absorption liquid flowing from opening 44 creates a quench waterfall 48, which contacts gas 21 flowing into device 20 from inlet duct 24. In U.S. Pat. No. 7,094,382, the flow rate of gas 21 is limited by the geometry of inlet duct 36, the geometry within a portion of spray tower 22 that contains flowing layer of absorption liquid 32, which is supported by upper side 34 of apertured plate 28, and the size of the pump(s) 40.

BRIEF SUMMARY

One aspect of the present application is a system for separating sulfur dioxide from a gas using an aqueous absorption liquid. The system includes a housing, a substantially horizontal apertured plate, at least one outlet box, at least one distribution mechanism, a container, and a pump and conduit. The housing includes an inlet adapted to receive the gas containing sulfur dioxide and an outlet adapted to expel the gas, from which sulfur dioxide has been separated. The substantially horizontal apertured plate is positioned between the inlet and the outlet. The apertured plate includes a lower side, an upper side, and a plurality of apertures fluidly connecting the lower and upper sides. The apertured plate is arranged to allow the gas containing sulfur dioxide to pass through the plurality of apertures from the lower side to the upper side and to support on the upper side a flowing layer of the absorption liquid. The at least one outlet box is used for collecting the absorption liquid flowing over the apertured plate and includes at least one aperture. The at least one distribution mechanism is fluidly connected with the at least one aperture of the at least one outlet box. The at least one distribution mechanism is arranged so that the absorption liquid in the at least one outlet box contacts the gas from the inlet before the gas passes through the plurality of apertures in the apertured plate. The container for containing the absorption liquid is fluidly connected with the housing. The pump and conduit is used to draw the absorption liquid from the container through the pump and through the conduit to the upper side of the apertured plate and along and over the apertured plate.

Another aspect of the present application is a system for separating sulfur dioxide from a gas using an aqueous absorption liquid. The system includes a housing, a substantially horizontal apertured plate, a quench waterfall, a container, and a pump and conduit. The housing includes an inlet adapted to receive the gas containing sulfur dioxide and an outlet adapted to expel the gas, from which sulfur dioxide has been separated. The substantially horizontal apertured plate is positioned between the inlet and the outlet. The apertured plate includes a lower side, an upper side, and a plurality of apertures fluidly connecting the lower and upper sides. The apertured plate is arranged to allow the gas containing sulfur dioxide to pass through the plurality of apertures from the lower side to the upper side and to support on the upper side a flowing layer of the absorption liquid. The apertured plate is positioned so that a gap is formed between one end of the apertured plate and a sidewall of the housing. The gap fluidly connects the upper side to the lower side. The quench waterfall is defined by absorption liquid flowing through the gap. The waterfall is arranged so that the absorption liquid flowing through the gap contacts the gas from the inlet before the gas passes through the plurality of apertures in the apertured plate. The container is used for containing the absorption liquid and is fluidly connected with the housing. The pump and conduit are used for drawing the absorption liquid from the container through the pump and through the conduit to the upper side of the apertured plate at a position opposite the gap. The absorption liquid flows from the conduit, along and over the apertured plate, and through the gap.

Yet another aspect of the present application is a method for separating sulfur dioxide from a gas using an aqueous absorption liquid. The method includes the following steps: directing the gas containing sulfur dioxide into a housing having an inlet and an outlet, the housing including a substantially horizontal apertured plate between the inlet and the outlet, the apertured plate including a lower side, an upper side, and a plurality of apertures fluidly connecting the lower and upper sides, the apertured plate being arranged to allow the gas containing sulfur dioxide to pass through the plurality of apertures from the lower side to the upper side and to support on the upper side a flowing layer of the absorption liquid; drawing the absorption liquid from a container through a pump and through a conduit to the upper side of the apertured plate to form the flowing layer of the absorption liquid; collecting the absorption liquid flowing over the apertured plate; distributing the absorption liquid collected in the collecting step such that it contacts the gas directed into the housing before the gas passes through the plurality of apertures in the apertured plate; returning the absorption liquid to the container; and expelling the gas from the housing through the outlet after it has been separated from the sulfur dioxide.

BRIEF DESCRIPTION OF THE DRAWINGS

For the purpose of illustrating the embodiments of the application, the drawings show a form of the embodiments that is presently preferred. However, it should be understood that the present application is not limited to the precise arrangements and instrumentalities shown in the drawings, wherein.

DETAILED DESCRIPTION

Figure 1:
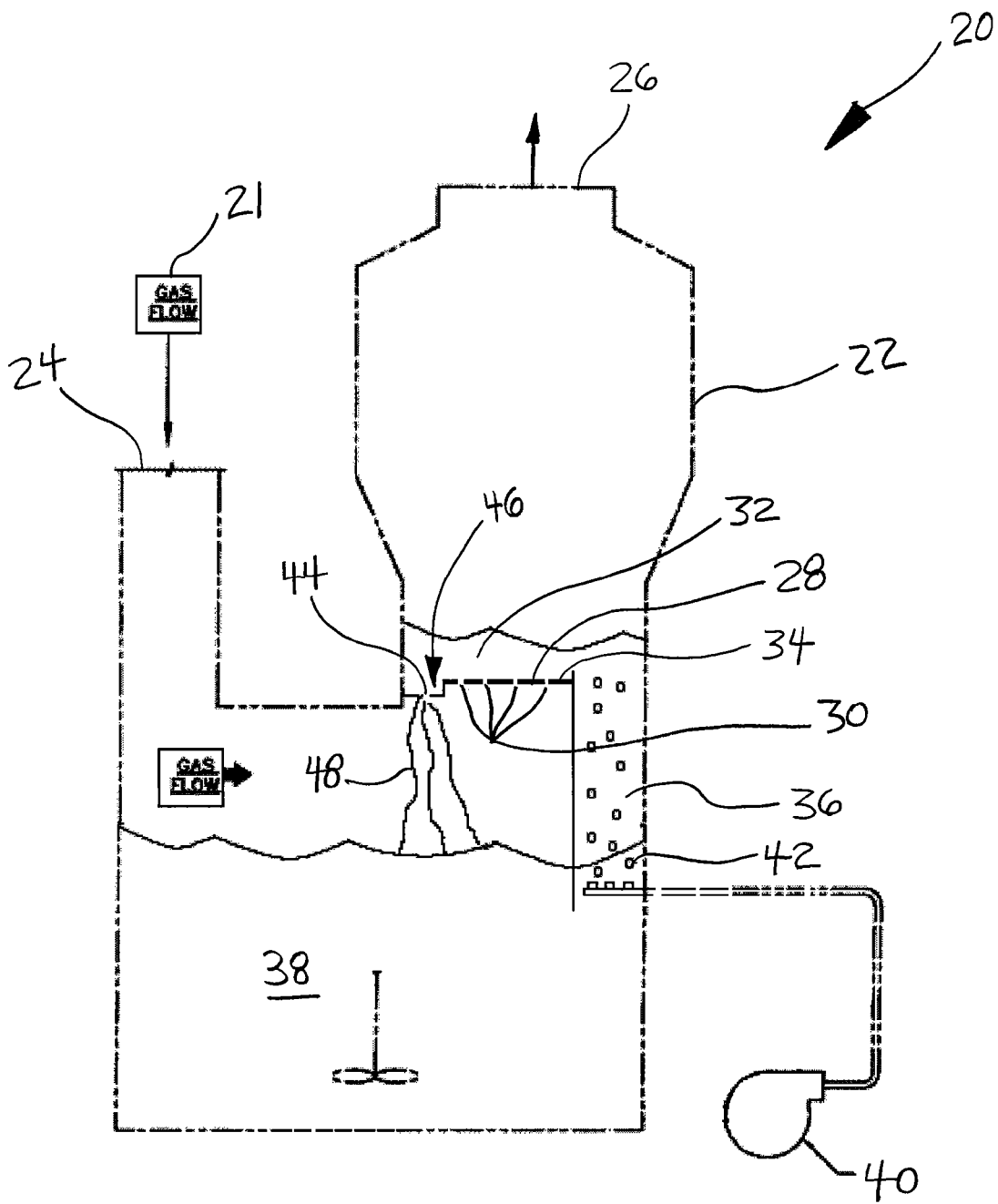
FIG. 1 is a side section view of a schematic of a system according to the prior art.
Figure 2:
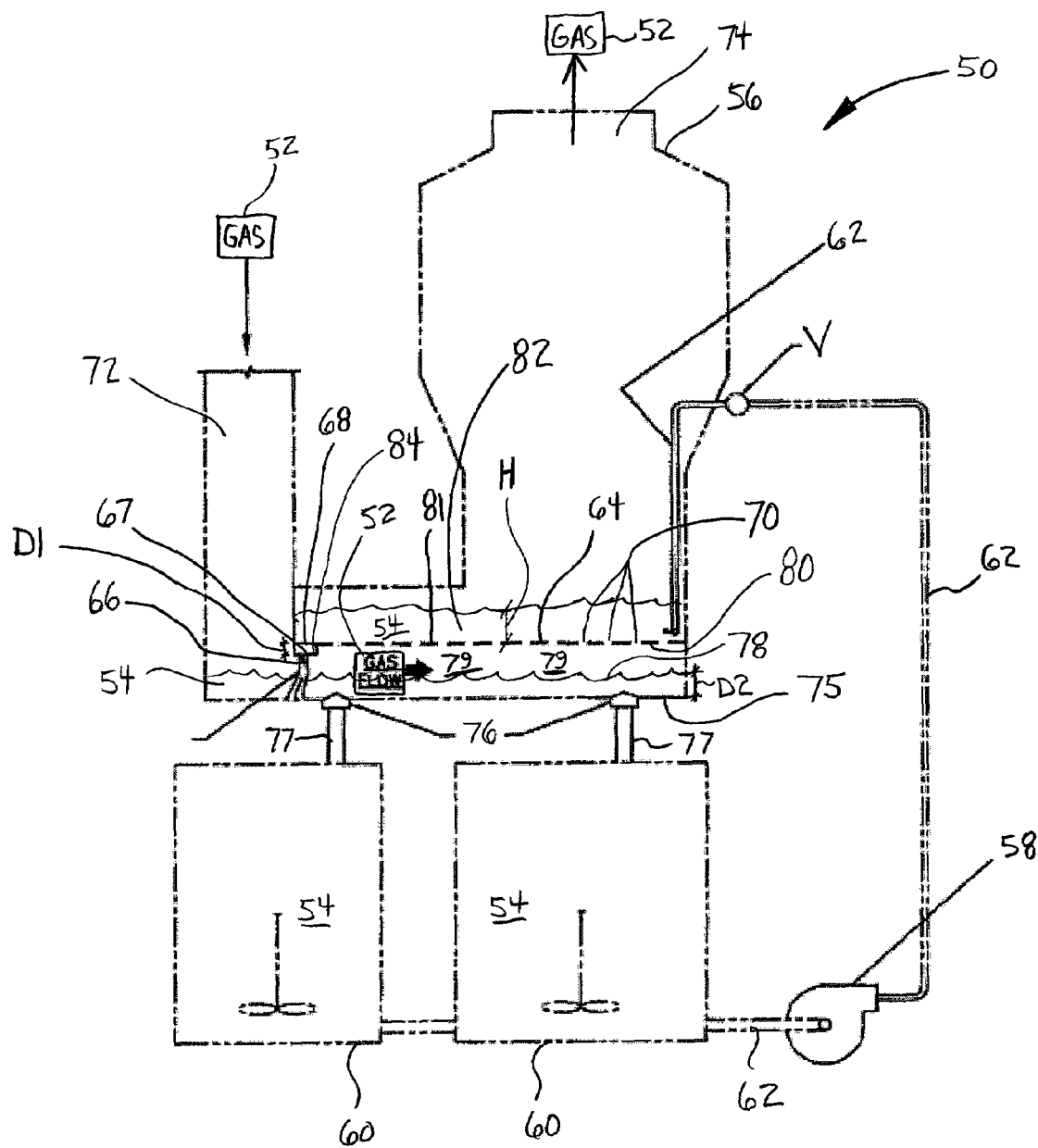
FIG. 2 is a side section view of a schematic of a system according to one embodiment of the present application.

Referring now to the drawings in which like reference numerals indicate like parts, and in particular, to FIG. 2, one aspect of the present application is a system 50 for separating sulfur dioxide from a gas 52 using an aqueous absorption liquid 54. In one embodiment, gas 52 is directed into a housing 56 while a pump 58 recycles absorption liquid 54 from a container 60 into the housing via a conduit 62. Housing 56 may be an existing spray tower as known in the art and described above or may be newly developed. In housing 56, absorption liquid 54 is directed to flow across a substantially horizontal apertured plate 64, through at least one distribution mechanism 66 joined with an aperture 67 in at least one outlet box 68, and back into container 60. At the same time, gas 52 contacts absorption liquid 54 as it exits at least one distribution mechanism 66 and as it flows upwardly through apertures 70 in substantially horizontal apertured plate 64.

Housing 56 generally includes an inlet 72 adapted to receive gas 52 containing sulfur dioxide and an outlet 74 adapted to expel the gas, from which sulfur dioxide has been separated. Housing 56 typically includes a bottom 75, which includes one or more drains 76 joined with a conduit 77. Conduit 77 is joined with container 60 for recycling absorption liquid 54 back to the container. Housing 56 is typically adapted so that a top surface 78 of absorption liquid 54 in the housing is positioned under outlet box 68, thereby forming a channel 79 between the top surface of the absorption liquid and the outlet box. Top surface 78 of absorption liquid 54 in housing 56 generally extends under substantially all of apertured plate 64.

Substantially horizontal apertured plate 64 is typically positioned between inlet 72 and outlet 74. Apertured plate 64 typically includes a lower side 80, an upper side 81, and plurality of apertures 70 fluidly connecting the lower and upper sides. Apertured plate 64 is generally arranged to allow gas 52 containing sulfur dioxide to pass through plurality of apertures 70 from lower side 80 to upper side 81 and to support on the upper side a flowing layer 82 of absorption liquid 54.

At least one outlet box 68 is adapted to collect absorption liquid 54 after it flows over apertured plate 64. Absorption liquid 54 exits outlet box 68 via at least one aperture 67 and though at least one distribution mechanism 66, which is fluidly connected with the at least one aperture of the at least one outlet box. Outlet box 68 typically includes a bottom 84 that is positioned a distance D1 below upper side 81 of apertured plate 64. Aperture 67 is generally formed in bottom 84. Distribution mechanism 66 may be a nozzle (not shown) or merely a gap (not shown). In one embodiment, distribution mechanism 66 is a nozzle that includes a smallest hole diameter or a smallest gap width of about 1 to 8 cm. Each distribution mechanism 66 is typically arranged so that absorption liquid 54 in outlet box 68 contacts gas 52 from inlet 72 before the gas passes through plurality of apertures 70 in apertured plate 64.

Container 60 is adapted for containing absorption liquid 54 and is typically fluidly connected with housing 56. Pump 58 and conduit 62 are used to draw absorption liquid 54 from container 60 through the pump and through the conduit to upper side 81 of apertured plate 64 and along and over the apertured plate into outlet box 68. Pump 58 can be used to selectively control a thickness or height H of absorption liquid 54 flowing over apertured plate 64. Pump 58 can also be used to selectively control a distance D2 between top surface 78 of absorption liquid and bottom 75 of housing 56. A valve V can also be used to control distance D and height H.

Figure 3:
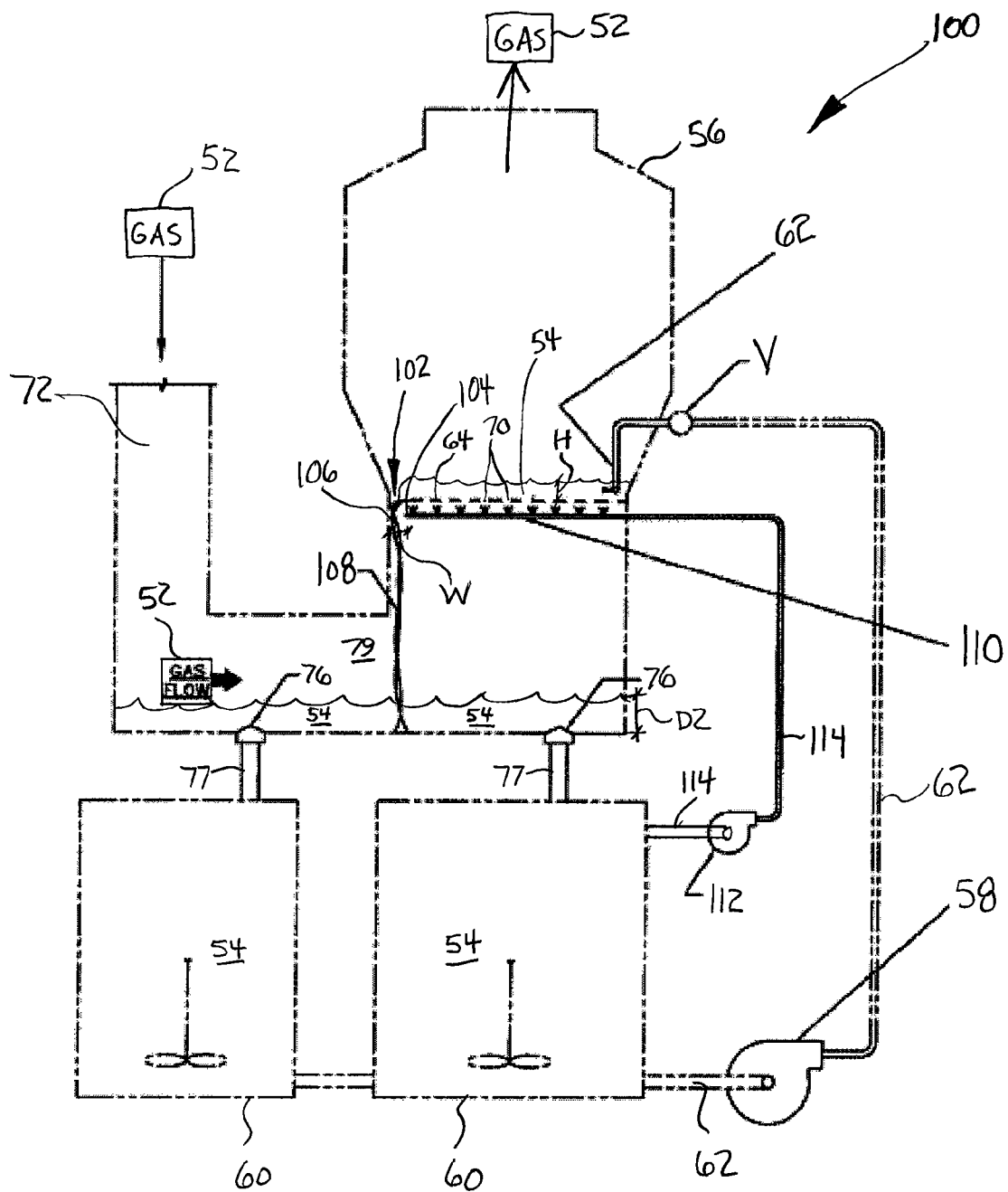
FIG. 3 is a side section view of a schematic of a system according to one embodiment of the present application.

Referring now to FIG. 3, a system 100, which is similar to system 50, generally does not include distribution mechanism 66, aperture 67, and outlet box 68. In place of distribution mechanism 66, aperture 67, and outlet box 68, a gap 102 can be formed between one end 104 of apertured plate 64 and a sidewall 106 of housing 56. Gap 102 is generally configured to fluidly connect lower side 80 and upper side 81 of apertured plate 64. Absorption liquid 54, which flows along upper side 81 of apertured plate 64, flows into gap 102. In this way, a quench waterfall 108 is defined by absorption liquid 54 flowing through gap 102. Quench waterfall 108 is generally arranged so that absorption liquid 54 flowing through gap 102 contacts gas 52 from inlet 72 before the gas passes through plurality of apertures 70 in apertured plate 64. Similar to system 50, pump 58 can be used to selectively control a thickness or height H of absorption liquid 54 flowing over apertured plate 64. A width W of gap 102 can also be varied to control the fluid dynamics of system 100. In one embodiment, width W of gap 102 is about 1 to 8 centimeters.

Still referring to FIG. 3, system 100 can also include a mechanism 110, e.g., a nozzle, pipe, or other conduit, for spraying absorption liquid 54 into gas 52 as it flows through plurality of apertures 70. Typically, mechanism 110 is positioned within channel 79 between top surface 78 of absorption liquid and bottom 75 of housing 56. Generally, absorption liquid 54 can be drawn from container 60 using a pump 112 and conduit 114 to spray the liquid through mechanism 110 upwardly and through plurality of apertures 70 from lower side 80 to upper side 81 of apertured plate 64. Although not illustrated, system 50 can also be adapted to include mechanism 110.

Figure 4:
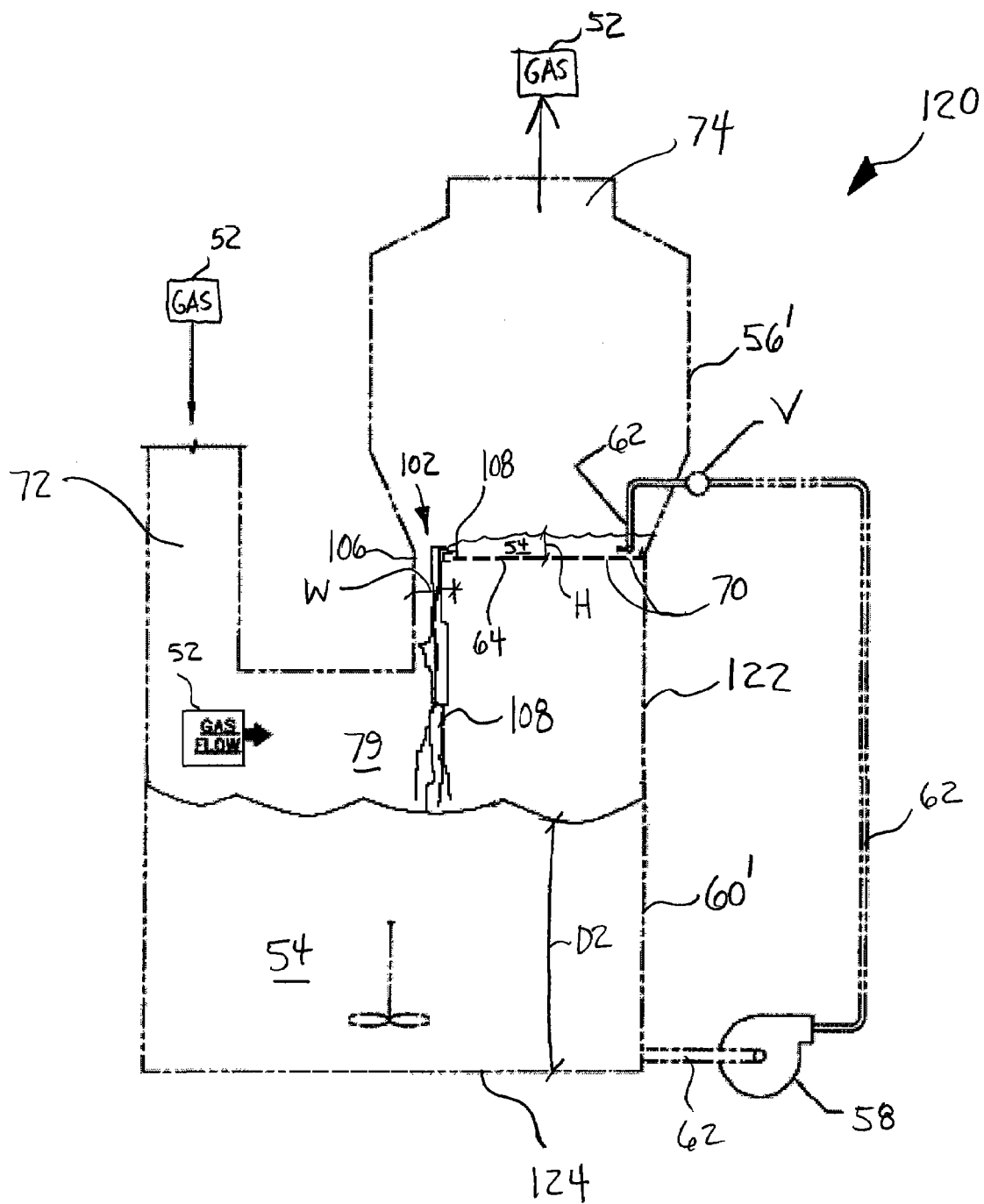
FIG. 4 is a side section view of a schematic of a system according to one embodiment of the present application.

Referring now to FIG. 4, a system 120, which is generally otherwise substantially similar to either system 50 or 100, can be configured to include a housing 56' and a container 60' formed in a contiguous chamber 122. In system 120, absorption liquid 54 drains directly to container 60' from upper side 81 of apertured plate 64 rather than via drains 76 and conduit 77 as in systems 50 and 100, which both include a housing 56 and container 60 formed from separate chambers. Similar to systems 50 and 100, in system 120, pump 58 can be used to selectively control a thickness or height H of absorption liquid 54 flowing over apertured plate 64. Pump 58 can also be used to selectively control a distance D2 between top surface 78 of absorption liquid 54 and a bottom 124 of container 60'.

The present application offers advantages over known systems. Pumping absorption liquid directly to the upper side of an apertured plate allows for a wider range of control over operating conditions and facilitates the retrofit of existing spray towers. The liquid bed or height of the absorption liquid is adjustable and therefore the acid gas removal can be controlled to a setpoint at very high performance levels.

Prior art designs rely on air lift to move the absorption liquid. In the disclosed subject matter, a pump can move liquid to much greater heights. This is an advantage in the space underneath the tray, and the corresponding gas volumes accepted.

Although the disclosed subject matter has been described and illustrated with respect to embodiments thereof, it should be understood by those skilled in the art that the foregoing and various other changes, omissions and additions may be made therein and thereto, without parting from the spirit and scope of the present application. Accordingly, other embodiments are within the scope of the following claims.

What is claimed is:

1. A system for separating sulfur dioxide from a gas using an aqueous absorption liquid, comprising:

a housing including an inlet adapted to receive the gas containing sulfur dioxide and an outlet adapted to expel the gas, from which sulfur dioxide has been separated;

a substantially horizontal apertured plate positioned between said inlet and said outlet, said apertured plate including a lower side, an upper side, and a plurality of apertures fluidly connecting said lower and upper sides, said apertured plate being arranged to allow the gas containing sulfur dioxide to pass through said plurality of apertures from said lower side to said upper side and to support on said upper side a flowing layer of the absorption liquid;

at least one outlet box for collecting the absorption liquid flowing over said apertured plate, said at least one outlet box including at least one aperture;

at least one distribution mechanism fluidly connected with said at least one aperture of said at least one outlet box, said at least one distribution mechanism being arranged so that the absorption liquid in said at least one outlet box contacts the gas from said inlet before the gas passes through said plurality of apertures in said apertured plate;

a container for containing the absorption liquid, said container fluidly connected with said housing; and a pump and conduit for drawing the absorption liquid from said container through said pump and through said conduit to said upper side of said apertured plate and along and over said apertured plate.

2. A system according to claim 1, wherein a flow rate of said pump is adapted for controlling a thickness or height of the absorption liquid flowing over said apertured plate.

3. A system according to claim 1, wherein said distribution mechanism includes at least one nozzle.

4. A system according to claim 3, wherein each of said at least one nozzle includes a smallest hole diameter or a smallest gap width of about 1 to 8 cm.

5. A system according to claim 1, wherein said at least one outlet box includes a bottom, said bottom being positioned a distance below said upper side of said apertured plate.

6. A system according to claim 1, further comprising means for spraying the absorption liquid into the gas as it flows through said plurality of apertures.

7. A system according to claim 1, wherein said housing further comprises a bottom, said bottom including a drain joined with a conduit, said conduit being joined with said container for recycling the absorption liquid back to said container.

8. A system according to claim 7, wherein said housing is adapted so that a top surface of the absorption liquid in said housing is positioned under said at least one outlet box, thereby forming a channel between said top surface of the absorption liquid and said at least one outlet box.

9. A system according to claim 8, wherein said housing is adapted so that said top surface of the absorption liquid in said housing extends under substantially all of said apertured plate.

10. A system according to claim 8, wherein a flow rate of said pump is adapted for controlling a distance between said bottom of said housing and said top surface of the absorption liquid.

11. A system according to claim 1, wherein said housing and said container are formed in a contiguous chamber.

12. A system according to claim 11, wherein said container is adapted so that a top surface of the absorption liquid in said container is positioned under said at least one outlet box, thereby forming a channel between said top surface of the absorption liquid and said at least one outlet box.

13. A system according to claim 12, wherein said container is adapted so that said top surface of the absorption liquid in said container extends under substantially all of said apertured plate.

14. A system according to claim 11, wherein a flow rate of said pump is adapted for controlling a distance between a bottom of said container and said top surface of the absorption liquid.

15. A system for separating sulfur dioxide from a gas using an aqueous absorption liquid, comprising:
a housing including an inlet adapted to receive the gas containing sulfur dioxide and an outlet adapted to expel the gas, from which sulfur dioxide has been separated;
a substantially horizontal apertured plate positioned between said inlet and said outlet, said apertured plate including a lower side, an upper side, and a plurality of apertures fluidly connecting said lower and upper sides, said apertured plate being arranged to allow the gas containing sulfur dioxide to pass through said plurality of apertures from said lower side to said upper side and to support on said upper side a flowing layer of the absorption liquid, said apertured plate positioned so that a gap is formed between one end of said apertured plate and a sidewall of said housing, said gap fluidly connecting said upper side to said lower side;
a quench waterfall defined by absorption liquid flowing through said gap, said waterfall being arranged so that the absorption liquid flowing through said gap contacts the gas from said inlet before the gas passes through said plurality of apertures in said apertured plate;
a container for containing the absorption liquid, said container fluidly connected with said housing; and
a pump and conduit for drawing the absorption liquid from said container through said pump and through said conduit to said upper side of said apertured plate at a position opposite said gap, wherein the absorption liquid flows from said conduit, along and over said apertured plate, and through said gap.

16. A system according to claim 15, wherein a flow rate of said pump is adapted for controlling a thickness or height of the absorption liquid flowing over said apertured plate.

17. A system according to claim 15, wherein said gap width is about 1 to 8 cm.

18. A system according to claim 15, wherein said housing further comprises a bottom, said bottom including a drain joined with a conduit, said conduit being joined with said container for recycling the absorption liquid back to said container.

19. A system according to claim 18, wherein said housing is adapted so that a top surface of the absorption liquid in said housing is positioned under substantially all of said lower side of said apertured plate, thereby forming a channel between said top surface of the absorption liquid and said lower side of said apertured plate.

20. A system according to claim 19, wherein said housing is adapted so that said top surface of the absorption liquid in said housing extends under substantially all of said apertured plate.

21. A system according to claim 19, wherein a flow rate of said pump is adapted for controlling a distance between said bottom of said housing and said top surface of the absorption liquid.

22. A system according to claim 15, further comprising means for spraying the absorption liquid into the gas as it flows through said plurality of apertures.

23. A system according to claim 15, wherein said housing and said container are formed in a contiguous chamber.

24. A system according to claim 23, wherein said container is adapted so that a top surface of the absorption liquid in said container is positioned under said lower side of said apertured plate, thereby forming a channel between said top surface of the absorption liquid and said lower side of said apertured plate.

25. A system according to claim 24, wherein said top surface of the absorption liquid in said container extends under substantially all of said apertured plate.

26. A system according to claim 23, wherein a flow rate of said pump is adapted for controlling a distance between a bottom of said container and said top surface of the absorption liquid.

27. A method for separating sulfur dioxide from a gas using an aqueous absorption liquid, comprising:
directing the gas containing sulfur dioxide into a housing having an inlet and an outlet, said housing including a substantially horizontal apertured plate between said inlet and said outlet, said apertured plate including a lower side, an upper side, and a plurality of apertures fluidly connecting said lower and upper sides, said apertured plate being arranged to allow the gas containing sulfur dioxide to pass through said plurality of apertures from said lower side to said upper side and to support on said upper side a flowing layer of the absorption liquid;
drawing the absorption liquid from a container through a pump and through a conduit to said upper side of said apertured plate to form said flowing layer of the absorption liquid;
collecting the absorption liquid flowing over said apertured plate;
distributing the absorption liquid collected in said collecting step such that it contacts the gas directed into said housing before the gas passes through said plurality of apertures in said apertured plate;
returning the absorption liquid to said container; and
expelling the gas from said housing through said outlet after it has been separated from the sulfur dioxide.

28. A method according to claim 27, further comprising the step of controlling a thickness or height of the absorption liquid flowing over said apertured plate by adapting a flow rate of said pump.

29. A method according to claim 27, further comprising the step of spraying the absorption liquid into the gas as it flows through said plurality of apertures.

\* \* \* \* \*